(12) United States Patent
Pijlman et al.

(10) Patent No.: US 8,260,100 B2
(45) Date of Patent: Sep. 4, 2012

(54) LIGHT GUIDING LAYER WITH INTEGRATED MIXING AND LIGHT EXTRACTING REGION

(75) Inventors: Fetze Pijlman, Eindhoven (NL); Michel Cornelis Josephus Marie Vissenberg, Eindhoven (NL); Giovanni Cennini, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 329 days.

(21) Appl. No.: 12/515,421

(22) PCT Filed: Nov. 20, 2007

(86) PCT No.: PCT/IB2007/054712
§ 371 (c)(1),
(2), (4) Date: May 19, 2009

(87) PCT Pub. No.: WO2008/065576
PCT Pub. Date: Jun. 5, 2008

(65) Prior Publication Data
US 2010/0080508 A1 Apr. 1, 2010

(30) Foreign Application Priority Data
Nov. 28, 2006 (EP) .................................. 06124870

(51) Int. Cl.
*G02B 6/26* (2006.01)
*G02B 6/10* (2006.01)
(52) U.S. Cl. ............. 385/31; 385/15; 385/130; 385/131
(58) Field of Classification Search .................... 385/15, 385/31, 47
See application file for complete search history.

(56) References Cited

U.S. PATENT DOCUMENTS

| | | | |
|---|---|---|---|
| 5,046,805 A | 9/1991 | Simon | |
| 6,124,906 A | 9/2000 | Kawada et al. | |
| 6,536,914 B2 | 3/2003 | Hoelen et al. | |
| 2002/0172039 A1 | 11/2002 | Inditsky | |
| 2005/0135116 A1 | 6/2005 | Epstein et al. | |
| 2006/0059264 A1 | 3/2006 | Leung et al. | |
| 2006/0146573 A1 | 7/2006 | Iwauchi et al. | |

FOREIGN PATENT DOCUMENTS

| | | | |
|---|---|---|---|
| EP | 0780265 A2 | 6/1997 | |
| EP | 1574780 A1 | 9/2005 | |
| FR | 2720181 A1 | 11/1995 | |
| JP | 2001093317 A | 4/2001 | |
| JP | 2002133907 A | 5/2002 | |
| JP | 2004171948 A | 6/2004 | |
| WO | 9708582 A1 | 3/1997 | |
| WO | 9964785 A1 | 12/1999 | |
| WO | 03048635 A1 | 6/2003 | |
| WO | WO 2006013565 A1 * | 2/2006 | |
| WO | 2007052842 A1 | 5/2007 | |

* cited by examiner

*Primary Examiner* — Michelle R Connelly
(74) *Attorney, Agent, or Firm* — Mark L. Beloborodov

(57) ABSTRACT

A light guiding layer comprises an optical incoupling structure (3) on which light from a light source (7) is incident, said optical incoupling structure (3) having a slanted surface (15) configured to give the light a first directional distribution by reflecting the light in a first general direction, by total internal reflection within the layer, towards a reflecting structure (5). The reflecting structure (5) is configured to give the light a second directional distribution by reflecting the light in a second general direction towards the optical incoupling structure (3), and at least a part of the light reflected in the second general direction is transmitted through the slanted surface (15) of the optical incoupling structure (3). A display unit, a segmented backlight, a luminaire, and a method is also disclosed.

14 Claims, 3 Drawing Sheets

LIGHT GUIDING LAYER WITH INTEGRATED MIXING AND LIGHT EXTRACTING REGION

TECHNICAL FIELD

The present invention relates to a light guiding layer with an integrated mixing and light-extracting region comprising an optical incoupling structure and a reflecting structure. The present invention further relates to a display unit, a segmented backlight, a luminaire and a method.

BACKGROUND OF THE INVENTION

Light guides are used for several kinds of lighting applications. Examples of such applications are LED-backlights for LCD televisions, LCD monitors and cellular phone displays. Light guides are required here to mix the light from several (sometimes colored) small light sources in order to create a homogeneous light emitting area. When the light is sufficiently mixed, the light is usually coupled out of the light guide by the use of a wedge shape, microstructured surface or dots of paint, towards the back of an image to be displayed for a viewer. Any reflection losses should be kept at a minimum.

A general problem of the above mentioned prior art is that the light is not always sufficiently mixed in all regions of the light guiding layer. Such regions may not be used for coupling out light and they should therefore be minimized or preferably omitted by incorporating more efficient light mixing.

US-2006/0146573, for example, discloses a technique for scattering light in a light guide. The scattering is achieved by transmitting light from a light source into a layer, which light is then repeatedly redirected by total internal reflection, i.e. towards a reflective object positioned at a distance from the point where the light is transmitted into the light guiding layer. When light is incident on the reflective object, the light, which has now been sufficiently mixed, is reflected by the reflective object such that the reflected light changes its directional distribution and thereby is emitted from the light guiding layer into a layer with extraction. A disadvantage with the described technique is that part of the reflected light is returned back to the light source. This decreases the efficiency of the system, in particular for small (segmented) backlights.

SUMMARY OF THE INVENTION

It is an object of the present invention to provide an improvement of the above techniques and prior art.

A particular object is to provide a light guiding layer having an incoupling structure that provides efficient incoupling and mixing of light.

Hence a light guiding layer is provided, comprising an optical incoupling structure on which light from a light source is incident. The optical incoupling structure has a slanted surface and is configured to give the light a first directional distribution by reflecting the light in a first general direction, by total internal reflection within the layer, towards a reflecting structure. The reflecting structure is configured to give the light a second directional distribution by reflecting the light in a second general direction towards the optical incoupling structure. At least a part of the light reflected in the second general direction is transmitted through the slanted surface of the optical incoupling structure.

Thus, the part of the light transmitted through the slanted surface may propagate through an extension of the light guide on the other side of the optical incoupling structure. Therefore, the optical incoupling structure may be positioned anywhere along the light guide.

The inventive light guiding layer is advantageous in that the optical incoupling structure may be positioned anywhere in the light guiding layer without causing divergent lighting properties at the location of the optical incoupling structure. Since part of the light with the second directional distribution at the incoupling structure is directed away from the source, the system is more efficient.

At least a part of the light reflected in the second general direction may be emitted out from the light guiding layer. Of course, a part of the light be emitted out from the light guiding layer may also be returned to the light guiding layer, by means of additional layers optically coupled to the light guiding layer.

The light incident from the light source may be collimated in at least one dimension, which is advantageous in that the light is more better guided through the light guiding layer.

Substantially all light which is incident from the light source may be incident on the slanted surface of the optical incoupling structure, which is advantageous in that any light leakage is reduced.

The reflecting structure may be positioned at an end of the light guiding layer, which is advantageous in that the light is mixed and emitted more efficiently.

At least a part of the light transmitted through the slanted surface of the optical incoupling structure may have a directional distribution within the light guiding layer, which further improves the light mixing and emission properties of the light guiding layer.

Since light may pass through the incoupling structure it may be positioned, for example, in the center of the light guiding layer while light still is distributed within the complete layer.

The optical incoupling structure may be partially covered by a reflective material, which is advantageous in that a light source may be located very close to the optical incoupling structure while still all light incident on the incoupling structure is reflected.

The optical incoupling structure may comprise, on a first side of the slanted surface, a substance having a refractive index n1, and on a second side of the slanted surface, a substance having a refractive index ns that is smaller than n1.

The light incident from the light source may have, inside the light guiding layer, an amount of collimation $2\alpha_{in}$ in a plane that is parallel to a normal of a main surface of the light guiding layer and a normal of the slanted surface of the incoupling facet, and the light incident on the slanted surface of the incoupling structure may have an average direction $\beta$ inside the light guiding layer.

The slanted surface of the optical incoupling structure may form an angle $\Gamma$ in relation to a normal of a main surface of the light guiding layer.

The light guiding layer may fulfill the condition $\beta \approx 2\Gamma - \pi/2$, and/or the light guiding layer may fulfill the condition $\sin(\pi/2 - (\Gamma - \beta + \alpha_{in})) > ns/n1$.

According to another aspect of the invention, a display unit is provided, according to still another aspect, a segmented backlight is provided, and according to yet another aspect, a luminaire is provided. The display unit, the segmented backlight, and the luminaire each comprises a light guiding layer incorporating any of the features described above in association with the inventive light guiding layer. The display unit further comprises an image generating means. The backlight and the luminaire further comprise a light source. The display, the backlight, and the luminaire may also involve other standard optical components such as redirection foils, diffusers, brightness enhancement foils and dual brightness enhancement foils. The inventive light guiding layer may also be incorporated in a luminaire that is color tuned.

According to yet another aspect of the invention, a method is provided, said method comprising the steps of:

emitting the light from a light source, said light being incident on a slanted surface of an optical incoupling structure of a light guiding layer, giving the light a first directional distribution by reflecting the light by means of the optical incoupling structure, in a first general direction, by total internal reflection within the layer, towards a reflecting structure, giving the light a second directional distribution by reflecting the light by means of the reflecting structure, in a second general direction towards the optical incoupling structure, and transmitting at least a part of the light reflected in the second general direction through the slanted surface of the optical incoupling structure.

Of course, the inventive method may incorporate any of the features described above in association with the inventive light guiding layer, and has the same corresponding advantages.

It should be noted that the term "substance" may be a solid material as well as gas or liquid, and that the term "slanted surface" may at least represent a planar, curved, spitted planar surface or any combination thereof.

BRIEF DESCRIPTION OF DRAWINGS

Embodiments of the present invention will now be described, by way of example, with reference to the accompanying schematic drawings, in which.

DETAILED DESCRIPTION OF EMBODIMENTS

Figure 1:
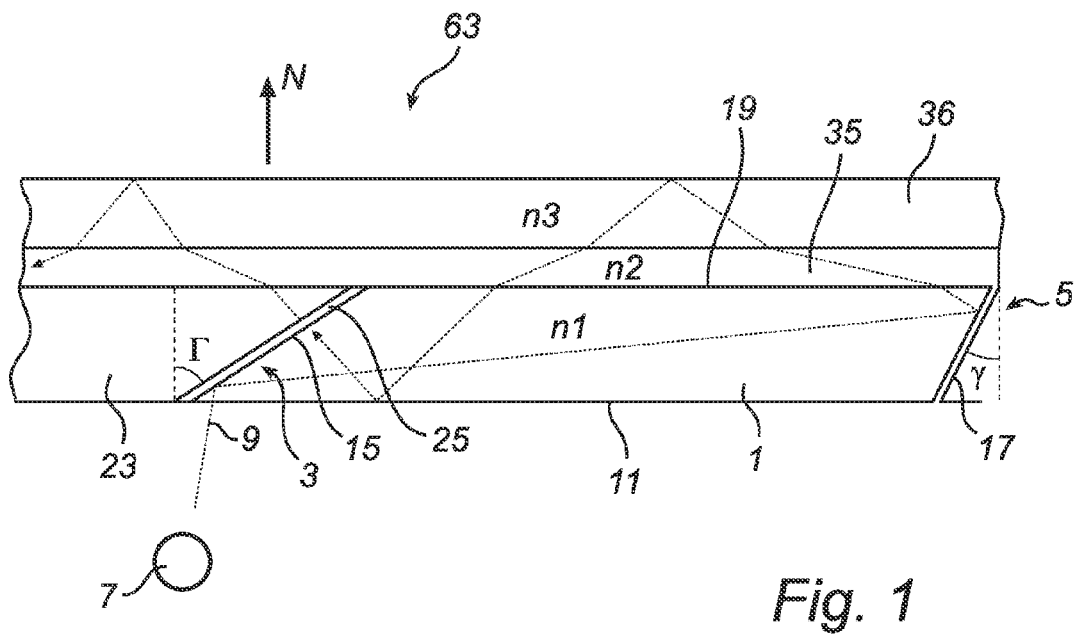
FIG. 1 is a is a cross-sectional view of a light guiding layer according to a first embodiment.
Figure 2:
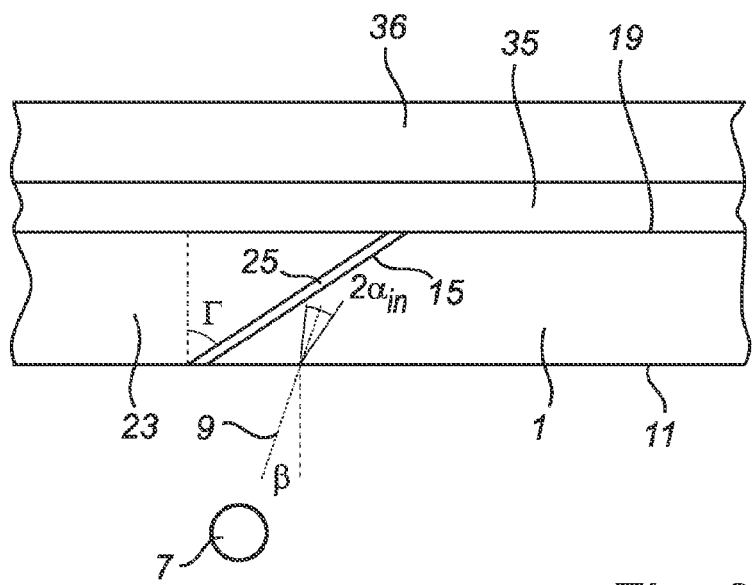
FIG. 2 is an enlarged sectional view of the light guiding layer of FIG. 1.

FIGS. 1 and 2 show a light guiding unit 63 that incorporate a light guiding layer 1. The light guiding layer 1 has an optical incoupling structure 3 and a reflective structure 5. A light source 7 emits light 9, which is collimated in one dimension such that the light in the light guide is collimated by an angle of $2\alpha_{in}$ as illustrated in FIG. 2, towards the incoupling structure 3 from a lower side 11 of the light guiding layer 1. The incident light has within the light guiding layer 1 an average direction β in relation to a normal N of a main surface of the light guiding unit 63. The main surface is per definition a surface 19 of the light guiding layer 1 that is facing a user viewing a display unit incorporating the light guiding layer 1. The optical incoupling structure 3 has a slanted surface 15 which is defined by an angle Γ in relation to the normal N. The slanted surface 15 is formed by a slit 25 made of a medium different from that of the light guiding layer 1, for example air. On the other side of the slit 25, a second part 23 of the light guiding layer 1 is located. The reflective structure 5 also has a slanted surface 17 which is defined by an angle γ in relation to the normal N. An additional light guiding layer 35 is positioned on top of the first light guiding layer 1, and a third light guiding layer 36 is positioned on top of the second light guiding layer for extracting light from the light guiding unit 63. As mentioned, the slit 25 is preferably an air slit.

The light guiding unit 63 can be a segmented backlight or a luminaire. The light guiding unit 63 can also form part of a display unit, which also comprises an image generating means, e.g. a liquid crystal element, which is backlit by the light guiding unit 63.

The light that couples into the light guiding layer 1 is reflected by total internal reflection by means of the slanted surface 15 of the incoupling structure 3. After being reflected, the light travels further into the light guiding layer 1 until it hits the reflective structure 5.

It should be noted that reflected light by the incoupling structure 3 is reflected away from the light source 7, such that it may not return to the light source 7, which improves the efficiency of the unit. Since the light source 7 is typically positioned underneath the light guiding layer 1, the system is of particular interest in connection with segmented backlights.

Any reflections that occur at the upper 19 or lower 11 surface of the first light guiding layer 1 is done by total internal reflection, i.e. no light is extracted out from the light-guiding layer 1. The reflective structure 5, which is coated with a thin reflective material such as aluminum, changes the angular distribution of the propagating light due to the angle γ of the slanted surface 17 of the reflective structure 5.

The returned light has such a distributional direction that at least a part of the reflected light is emitted out from the light guiding layer 1, and such that at least a part of the reflected light is transmitted through the slanted surface 15 of the optical incoupling structure 3. Thereafter the second part 23 of the light guiding layer 1, which in FIG. 1 is located to the left of the incoupling structure 3, receives the transmitted light. This means that the second part 23 of the light guiding layer 1 is used for light extraction as well.

The slit 25 medium has a refractive index approximately equaling one (such as air), and five different conditions are to be considered, all obtained using Snell's law that states that the refractive index of a medium times the sine function of the incident angle equals the refractive index of a second medium times the sine function of the refractive angle, i.e. a light wave is continuous across a boundary.

The first condition to be fulfilled is that the light in the light guiding layer 1 hits the slanted surface of the optical incoupling structure 3 just after being coupled into the light guiding layer 1. This puts a lower limit on the thickness of the light guide.

The second condition is that the coupled light should, after the total reflection at the optical incoupling structure 3, travel substantially parallel with the light guiding layer 1 towards the slanted surface 17 of the reflective structure 5. This gives the relation $\beta \approx 2\Gamma - \pi/2$.

The third condition defines that the light that is coupled in should be reflected at the slanted surface 15 of the incoupling structure 3 by total internal reflection. This leads to the following condition: $\sin(\pi/2 - (\Gamma - \beta + \alpha_{in})) > ns/n1$. Here ns denotes the refractive index of the slit 25 medium. ns should be smaller than n1, and in case of air ns=1.

The fourth condition is associated with the part of the light that returns to the incoupling structure 3 and which is reflected by the slanted surface 15 of the incoupling structure 3 when that light last was reflected at the upper 19 surface of the light guiding layer 1. If $(\pi/2 - \Gamma) > 2\gamma$, then there is an additional condition to be fulfilled (demanding total internal reflection at the first plane of the light guiding layer 1 after the reflection): $2\Gamma+2\gamma-\alpha_{in}-\pi/2>\arcsin(ns/n1)$. The quantity $2\gamma$ characterizes the direction of the returned light from the reflecting structure 5.

The fifth condition defines that light that returns to the incoupling structure 3 that last had an interaction with the lower surface 11 of the light guiding layer 1 should be able to transmit into the second part of the light guiding layer 23. Introducing the variables $\xi_M=\arctan(\tan(3\pi/2+2\gamma\pm\alpha_{in})/\cos(\delta))$ and $\xi_A=\arctan(\tan(3\pi/2+2\gamma)/\cos(\delta))$ and the function $f(\xi)= \|\pi-|\arccos(\sin(\xi)\cos(\delta)\cos(\Gamma)-\cos(\xi)\sin(\Gamma))|\|$, this leads to the following constraints: $f(\xi_M)<\arcsin(ns/n1)$ and $f(\xi_A)<\arcsin(ns/n1)$. If $2\gamma<\pi/2-\Gamma$ then there is an additional constraint. Introducing $\xi_E=\arctan(\tan(\pi/2+\alpha_{in}-2\gamma-2\Gamma)/\cos(\delta))$, that constraint reads $f(\xi_E)<\arcsin(ns/n1)$.

Figure 5:
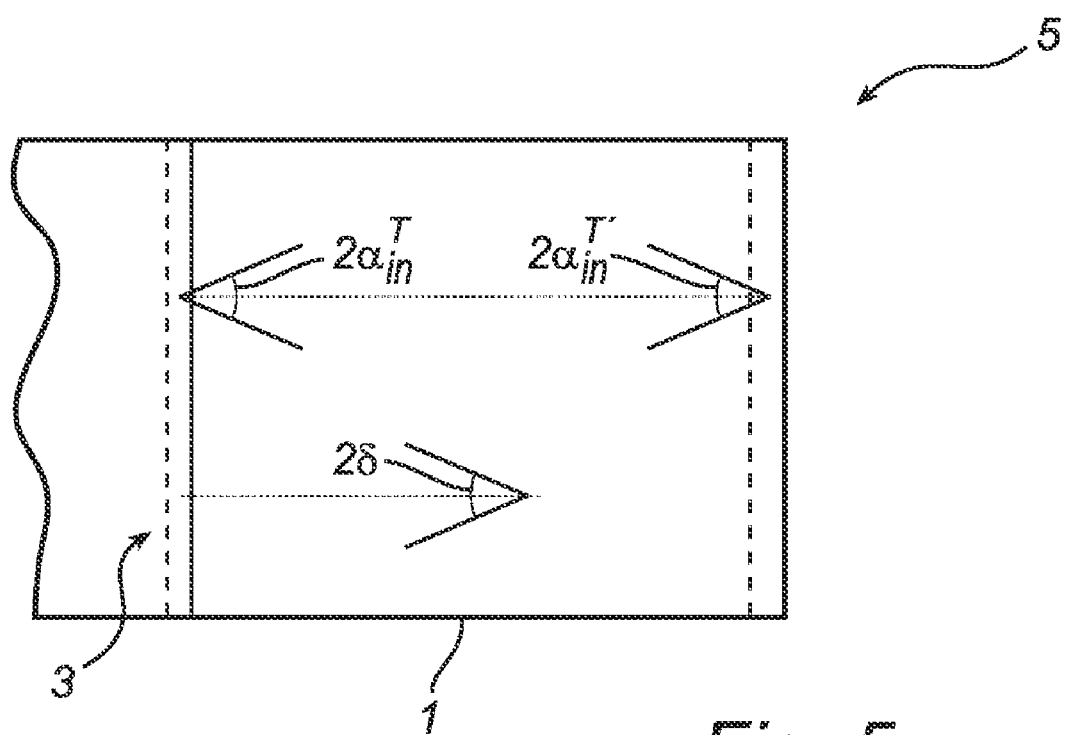
FIG. 5 is a top view of the light guiding layer of FIG. 1.

Here, with reference to FIG. 5, $2\delta$ is the amount of collimation of the light perpendicular to the plane of FIG. 1.

All five conditions are conservative, meaning that less strict conditions will still work, however some light leakage might occur.

Besides the five conditions mentioned, the system is preferred to substantially obey the following three restricting conditions:

The light from the light source 7 shall travel via internal reflection to the reflecting structure 5. This condition is fulfilled when $\pi/2-\alpha_{in}>\arcsin(n2/n1)$, where $2\alpha_{in}$ is the collimation of the light in the light guiding layer 1.

The light that is reflected by the reflecting structure 5 should be able to penetrate the higher layers. This condition is fulfilled when $\pi/2-\arctan(\tan(2\gamma-\alpha_{in})\cos(\alpha_{in}^{T'}))<\arcsin(n2/n1)$, where $\alpha_{in}^{T'}$ is the collimation of the reflected light in the light guiding layer 1 in the direction perpendicular to the plane of FIG. 1 and $\gamma$ is the angle of the slanted reflecting structure 5. For simplicity the approximation $\alpha_{in}^{T'}=\alpha_{in}^{T}$ may be done. It should be noted that $\alpha_{in}^{T'}$ and $\alpha_{in}^{T}$ are usually not identical, but often approximately equal, and that when light is collimated in the direction perpendicular to the plane of FIG. 1 ($\alpha_{in}^{T}$), then a smaller amount of collimation in the plane of FIG. 1 is needed ($\alpha_{in}$).

Preferably the light which is reflected by the reflective structure 5 does not exit the upper layers 35, 36 via transmittance into the air (except via an outcoupling structure). This total internal reflection condition is fulfilled when $\pi/2-2\gamma-\alpha_{in}>\arcsin(n2/n1)$.

Some typical values for the above mentioned parameter is $\gamma=19$ degrees, $\Gamma=51$ degrees, $n1=1.49$, $n2=1.44$, $\beta=12$ degrees and $\alpha_{in}=8$ degrees.

It is essential that the directional angular distribution of the incoupled light does not overlap, or barely overlap with the directional angular distribution of the light that is reflected by the reflective structure 5. Here the directional angular distribution means the distribution of angles with respect to the normal N of the light guiding unit 63. Also this condition is fulfilled by the five conditions mentioned above.

Figure 3A:
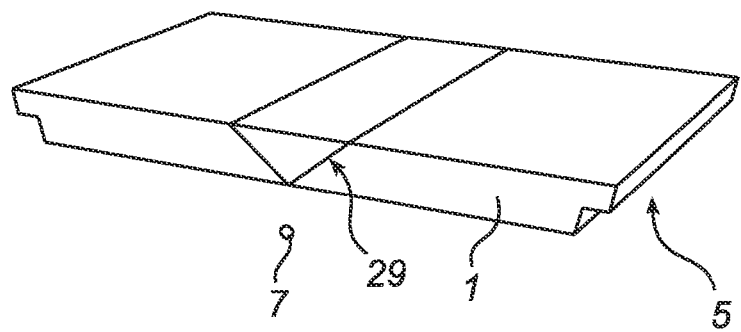
FIG. 3a is a is a perspective view of a light guiding layer according to a second embodiment.
Figure 3B:
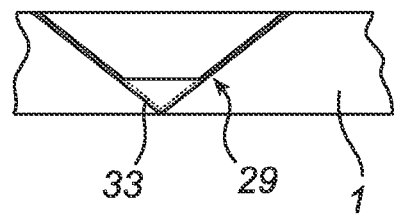
FIG. 3b is an enlarged sectional view of the light guiding layer of FIG. 3a, FIGS. 4a-4d are principal views of four embodiments of the reflecting structure.
Figure 4A:
Figure 4B:
Figure 4C:
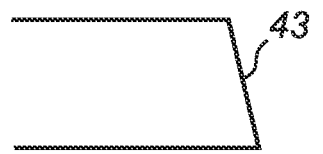
Figure 4D:
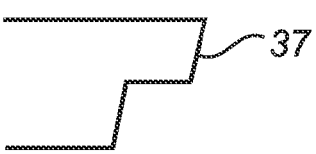

FIG. 3 shows two similar light guiding layers 1, all having the same refraction index, which are used in order to decrease the amount of collimation.

As shown in FIG. 3, the triangular incoupling structure 29 may be partly covered with a mirror foil 33 in order to prevent possible rays of light from entering the incoupling structure 60 after being emitted from a light source.

In FIG. 4, the reflection structure 5 is stair-cased 37 or segmented 39. Also shown, the reflection structure 5 could be slanted inwardly 41 or outwardly 43 or slanted in a combination thereof 45.

Optional additional layer 35 and/or 36 on top of the light guiding layer 1 may extend over several light guiding segments to mix the light between those segments, like the one shown in FIG. 3, or to prevent sharp boundaries between segments. Instead of extending the top layer, the same effect can be achieved by introducing another additional layer that is in optical contact with the several segments, e.g. below the light guiding layer 1.

In one embodiment the light guides are elongated and especially suited for scanning or one-dimensional dimmable backlights. The light is coupled in from below when the elongated light guides cover one dimension of the backlight.

As mentioned and as known within the art, the light guiding unit 63 may have additional layers 36 in which light extraction may take place. Although this invention is particularly suited for several layers, the invention here does not rely on the presence of multiple layers, or on the manner in which directional distribution of the returned light is established.

The light which is incident on the slanted surface of the optical incoupling structure 3 has in the light guide a collimation angle $2\alpha_{in}$ in the plane of FIG. 1, typically in the range of 0-20 degrees. Collimation in the other direction $\delta$ (perpendicular to a) would limit the light mixing but would also soften the limit of collimation in the first direction. However, the light does not need to be collimated in the other direction, which would enhance the uniformity of the backlight. The light source 7 can be of any known type, e.g. a light emitting diode, a cold cathode fluorescent lamp or an organic light emitting diode.

The optical incoupling structure 3 should be made of an optically transparent material suitable for guiding light. The refractive index of the slit 25 medium is preferably below the refractive index of the light guiding material 1. The slit medium 25 could be air. The refractive index of the second part 23 of the light guiding layer may also be different from the refractive index of the first part (that is opposite the second part 23 as seen from the incoupling structure 3).

Although the invention above has been described in connection with preferred embodiments of the invention, it will be evident for a person skilled in the art that several modifications are conceivable without departing from the invention as defined by the following claims.

The invention claimed is:

1. A light guiding layer formed by an upper surface and a lower surface arranged substantially parallel to each other, the light guiding layer comprising
   an optical incoupling structure arranged within the light guiding layer and partitioning the light guiding layer into a first part and a second part, said optical incoupling structure having a slanted surface forming a first angle with a normal to the upper surface and the lower surface, wherein the first angle is selected such that a light incident to the slanted surface is given a first directional distribution by reflecting the light in a first general direction substantially parallel to the upper surface and the lower surface towards a reflecting structure,
   the reflecting structure being configured to give the light a second directional distribution by reflecting the light in a second general direction towards the optical incoupling structure, wherein the reflecting structure forms a second angle with the normal to the upper surface and the lower surface, the second angle is oblique and selected in dependence with the first angle such that at least a part of the light reflected in the second general direction is transmitted through the slanted surface of the optical incoupling structure into the second part of the light guiding layer.

2. A light guiding layer according to claim 1, wherein at least a part of the light reflected in the second general direction is emitted out from the light guiding layer.

3. A light guiding layer according to claim 1, wherein the light incident from the light source is collimated in at least one dimension.

4. A light guiding layer according to claim 3, wherein the light incident from the light source has, inside the light guiding layer, an amount of collimation ($2\alpha_{in}$) in a plane that is parallel to a normal (N) of a main surface of the light guiding layer and a normal of the slanted surface of the incoupling structure.

5. A light guiding layer according to claim 3, wherein the light incident on the slanted surface of the incoupling structure has an average direction ($\beta$) inside the light-guiding layer.

6. A light guiding layer according to claim 1, wherein substantially all light incident from the light source is incident on the slanted surface of the optical incoupling structure.

7. A light guiding layer according to claim 1, wherein the reflecting structure is positioned at an end of the light guiding layer.

8. A light guiding layer according to claim 1, wherein at least a part of the light transmitted through the slanted surface of the optical incoupling structure has a directional distribution within the light guiding layer.

9. A light guiding layer according to claim 1, wherein the optical incoupling structure is partially covered by a reflective material.

10. A light guiding layer according to claim 1, wherein the optical incoupling structure comprises, on a first side of the slanted surface, a substance having a refractive index n1, and on a second side of the slanted surface, a substance having a refractive index ns that is smaller than n1.

11. A light guiding layer according to claim 1, wherein the slanted surface of the optical incoupling structure forms an angle ($\Gamma$) in relation to a normal (N) of a main surface of the light guiding layer.

12. A light guiding layer according to claim 11, wherein $\beta \approx 2\Gamma - \pi/2$.

13. A light guiding layer according to claim 11, wherein $\sin(\pi/2 - (\Gamma - \beta + \alpha_{in})) > ns/n1$.

14. A method of guiding light, said method comprising the steps of:
  emitting the light from a light source toward a slanted surface of an optical incoupling structure of a light guiding layer,
  giving the light a first directional distribution by reflecting the light by means of the optical incoupling structure, in a first general direction, by total internal reflection within the layer, towards a slanted surface of a reflecting structure, such that the light, after being coupled within the light guiding layer, is reflected by the optical incoupling structure substantially parallel with the light guiding layer,
  giving the light a second directional distribution by reflecting the light by means of the reflecting structure, in a second general direction towards the optical incoupling structure, and
  transmitting at least a part of the light reflected in the second general direction through the slanted surface of the optical incoupling structure.

* * * * *